2,886,404
SPINNING AMORPHOUS GLASS FIBERS FROM A VISCOUS AQUEOUS SYSTEM

Jayanti Dharma Teja, Whitestone, N.Y., assignor to Montecatini-Società Generale per l'Industria Mineraria e Chimica, Milan, Italy, a corporation of Italy No Drawing. Application April 26, 1957
Serial No. 655,167
4 Claims. (Cl. 18—54)

This invention relates to the manufacture of glass fibers (filaments) from aqueous systems at moderate temperatures.

The glass state is that condition in which the material is dense, rigid and non-crystalline. The most rigid materials, when in sufficiently small diameter fiber form, are reasonably flexible. Ordinary inorganic glass consists of a mixture of metal oxides having the close-packed structure providing relatively high density, amorphous (non-crystalline) character, and significant rigidity. Although glass is ordinarily prepared by reasonably rapid cooling of a fused mixture of metal oxides, procedures have been developed for preparing inorganic glass from aqueous systems. Reference is made to the patent application of J. D. Teja, Serial No. 526,779, filed August 5, 1955, entitled Manufacturing Glass Fibers, of which this is a continuation-in-part. Reference is also made to the common subject matter disclosed in the patent application of J. D. Teja, Serial No. 511,131, filed May 25, 1955, entitled Preparation of High Molecular Weight Materials.

There are two forms of amorphous silica which provide good reference standards for compositions prepared from aqueous siliceous compositions. Fused silica fibers have a density of about 2.2 g./ml., a very high tensile strength of the order of 1,000,000 pounds per square inch, and tend to absorb only minor amounts of water. An activated, dehydrated silica gel has a bulk density of about 0.8 g./ml., a very slight tensile strength, and a capacity to absorb water so firmly that the complete removal of the relatively large amounts of water requires prolonged heating at elevated temperatures such as 1200° F. Filaments partaking of the nature of rods of silica gel have previously been prepared from aqueous systems comprising sodium silicate, but because such filaments have not possessed tensile strengths competitive with commercially available glass fibers, no previous method of making long siliceous filaments from aqueous systems has been commercialized. Previous methods have been described in: Grossman, U.S. Patent 1,730,609; British Patent 352,681; British Patent 504,883; W. Noll, Z. anorg. Chem. 261, 1 (1950); G. Stiz, Reichsber. Chem. 1, 141 (1941) P. B. 52,025 (2); W. Eppracht, Schweiz. mineralog. petrolog. Mitt. 27, 1 (1947); Nat. Bur. Std. Tech. News Bull. 35, 177 (1951); and Skaupy U.S. Patent 2,388,463.

The tensile strength of a synthetic inorganic fiber is dependent to a great extent upon the freedom from the porous gel type of structure and upon the presence of the high density structure analogous to that resulting from drawing a fused glass. Heretofore activated silica spheres, silica-alumina catalysts, and related particles have been prepared by the controlled dehydration of shaped siliceous gelatinous compositions. Heretofore inorganic fibers have been prepared in an analogous manner, the siliceous gelatinous composition being shaped into a jelly rod which was dehydrated to form a porous solid of low tensile strength and low density. Such ordinary dehydrations of ordinary siliceous, gelatinous rods are believed to be unsuitable for the preparation of high strength fibers. Several approaches or combinations of approaches to the goal of achieving high strength fibers may be possible. This invention is particularly concerned with that approach by which a substantially dehydrated glass structure of the fiber is achieved by the combination of syneresis, diameter-reduction, and stretching of the stream which forms the fiber said stream initially being a viscous aqueous system partaking of the nature of an alkaline silicate solution containing not only colloidal silicate particles but also oxygen containing compounds of at least one metal, the oxides of which belong in the long established group of metal oxides which have been incorporated in significant amounts in the various formulations of fused transparent silicate glass described in textbooks on glass, and sometimes known as the non-alkaline glass-component oxides.

Data relating to the bond strengths contributed by such glass component oxides, showing for example, that boria tends to strengthen a glass composition more than arsenic oxide, provide criteria useful in selecting the glass-component oxides. Certain metal oxides such as iron oxide, chromium oxide, and the like, readily exist as colored solids, and these solids are capable of imparting color to fused silicate glasses, and have been employed, not to impart strength or related characteristics to the glass, but merely to color the glass. Although the oxides of such metals can be employed in the preparation of colored glass fibers, they are excluded from the group of glass-component oxides as the term is used herein.

Most glasses contain silica and one of the group consisting of sodium oxide and potassium oxide plus at least one of the group of non-alkaline glass-components. This group of non-alkaline glass components is described in glass textbooks as consisting essentially of the oxides of boron, aluminum, zirconium, titanium, zinc, calcium, barium, arsenic, germanium, phosphorus, lead, thorium, beryllium and tungsten. Such textbooks classifications of the non-alkaline glass components are employed in the present specification.

In order to form strong glass fibers from streams of aqueous siliceous systems, solidification must be postponed until the siliceous material has a density of the general magnitude of the fused, anhydrous composition. After solidification, the surface of the fiber can be modified, and water can be removed from the surface, or even from the interior of the fiber, but a significant portion of the control of the density and tensile strength of the filaments must be achieved prior to solidification. Dehydration of the interior of the filament subsequent to solidification, even when it is accompanied by some shrinkage and increase of density, fails to increase the tensile strength as much as proper control of the dehydration prior to solidification.

Providing the optimum conditions for the preparation of strong glass fibers from aqueous systems is based in part upon utilizing the kind of reaction mechanisms occurring biologically in forming glass-like materials (diatoms, shell-fish, sponges, bamboo, etc.). The chain reaction of hydrogen ion transfer is believed to account for much of the dehydration of such siliceous material in a water-containing environment in biology, in the polymerization of siliceous materials, and in the glass fiber formation of the present invention.

Some dehydration phenomena are not entirely understood. Syneresis is a term applied to the transformation of a highly hydrated material to a substantially completely dehydrated material in the presence of water. For example, a colloidal suspension of ceric hydroxide can undergo syneresis to form a dehydrated, amorphous, glassy cerium oxide.

Such phenomena are peculiar to specific systems under specific dehydration conditions, and most materials at most dehydration conditions cannot undergo syneresis.

During syneresis, the water molecules and the metal oxides each may have high mobility until almost the instant of solidification, possibly attributable to the existence of aqueous systems containing only tiny amounts of water but still permitting ion migration and water migration as in a liquid solution. After the metal oxides are brought into the sufficiently close-packed condition during the earlier stages of syneresis, interfacial tension forces may bring about the final stages of water expulsion and the solidification in the substantially dehydrated state.

In accordance with the present invention, one prepares a glass fiber by a method which includes the steps of: preparing a viscous aqueous system consisting essentially of water, oxygen-containing compounds of at least one metal of the group consisting of boron, aluminum, zirconium, titanium, zinc, calcium, barium, arsenic, germanium, phosphorus, lead, thorium, beryllium and tungsten, the oxides of said metals being of the non-alkaline glass-component metal oxide group, oxygen-containing compounds of at least one alkali of the group consisting of sodium and potassium, and oxygen-containing compounds of silicon comprising silicate particles of colloidal dimensions; forming a viscous stream of said aqueous systems; contracting the diameter of the stream by elongating the viscous stream in a gaseous atmosphere containing at least 10 mm. water vapour partial pressure, there being simultaneous elongating and syneresis, whereby water is concentrated at the surface of the stream and oxygen-containing compounds of silicon and metals are concentrated at the core of the stream, so that the diameter-contracting continues until the density of the core of the stream is of the magnitude of the density of a fused anhydrous fiber containing compounds of silicon and the metals of the same proportions; evaporating water from the surface of the stream; and withdrawing as the product of the method a stable, amorphous glass fiber containing less than 10% water, more than 40% silica, glass-component oxides of at least one metal of the group consisting of boron, aluminum, zirconium, titanium, zinc, calcium, barium, arsenic, germanium, phosphorus, lead, thorium, beryllium, and tungsten, and an oxide of at least one alkali metal of the group consisting of sodium and potassium, said glass fiber having a tensile strength of at least 30,000 pounds per square inch.

In certain modifications of the invention, the freshly formed fiber is subjected momentarily to an aqueous solution of a dehydration catalyst selected from the group consisting of volatile acid, zirconium salts, and volatile, water-miscible organic solvents. The catalyst treated fiber is treated at in a hot drying zone (much below the fusion temperature of such glass) to bring about the removal of additional water and to further dehydrate the surface of the fiber.

The colloidal silicate particles in the stream of viscous liquid being elongated provide nuclei for the growth of glass.

The term "water glass" has been applied to aqueous alkaline silicate systems, and it has been possible heretofore to prepare compositions which initially possessed some of the amorphousness of glass but which contained sufficient internal water to undergo crystallization modifications within short periods of time such as weeks or months. Only by achieving an internal structure which is so close-packed as to be substantially completely dehydrated is it possible to achieve a stable glass, that is, a glass which does not lose its amorphousness upon aging for long periods of time such as quarter or years. A stable glass fiber is a glass fiber which does not lose the tensile strength and amorphous characteristics upon aging for more than three months.

Although the surface areas of the high density glass fibers are only a tiny fraction of the surface areas of dehydrated gels, still they are large surface areas for evaporation phenomena. A glass fiber having a diameter of about 0.5 micron has a surface area of about 3.14 m.$^2$/g. and a length of about 2 megameters/g. This corresponds to a surface area of about ¼ acre per pound and a length of about 565,000 miles per pound. In evaporating one gram of water from a surface area of the magnitude of 3 square meters, the thickness of the film evaporated is about 3,300 Angstroms. In transforming a system containing about 50% water into an anhydrous glass fiber having a half-micron diameter, the 3,300 A. thickness of water film evaporated would be less than the fiber diameter of about 5,000 A. More concentrated compositions would require the evaporation of water equivalent to correspondingly thinner films. The evaporation requirements for larger diameter fibers involve relatively thicker water films. Glass fibers having a diameter within the range from about 0.4 to about 20 microns have sufficiently large surface areas to permit evaporation of water therefrom much more readily than in the case of relatively large diameter filaments such as 40 or 50 microns' diameter filaments. Attempts to achieve the substantially completely dehydrated glass structure by the methods of the present invention have been unsuccessful whenever the fiber diameter has been greater than 20 microns. Accordingly, there is basis for treating the 20 micron maximum diameter as a critical limitation.

The technical subject matter pertinent to the present invention is better understood by reference to a series of examples.

EXAMPLE I

Boric acid is ordinarily soluble in cold water only to the extent of about 5% by weight or about 50 g./l. boria (boric oxide) is about half as soluble as boric acid. Notwithstanding these solubility limits, an aqueous composition was prepared containing relatively large amounts of boria.

A colloidal solution of silica, containing about 15% silica, and substantially free from dissolved salts or alkalies, was prepared by dialyzing the neutralization product of acid and sodium silicate solutions. To 200 ml. of this colloidal silica solution, 100 g. of boria were added gradually with stirring, thus forming an aqueous system containing about 33% boria. Possibly the boria was in part adsorbed on the surface of the colloidal silica particles. Possibly the system included both dissolved and adsorbed boria.

In the industrial production of calcium silicate pigments and in other procedures, it has been observed that calcium silicate materials readily form upon the mixing of aqueous solutions of calcium hydroxide and aqueous solutions of soluble or colloidal silica. However, upon the addition of 30 g. of calcium hydroxide to the colloidal solution of boria-silica, no precipitate formed, and the system retained a surprisingly uniform consistency. Alumina was also added to the system without bringing about the precipitation which ordinarily results from mixing non-alkaline aluminaceous and siliceous aqueous systems. Certain advantages were observed in adding the alumina prior to instead of subsequent to adding the calcium hydroxide, but either procedure was successful. Good results were obtained by the use of 50 g. of alumina. In this manner, 350 g. of a paste of uniform consistency was prepared containing 30 g. of colloidal silica, 100 g. of boria, 50 g. of alumina, 30 g. of calcium hydroxide (210 g. of solids) and 170 g. of water. This paste is useful as an intermediate product in the preparation of compositions useful in the drawing of glass fibers.

EXAMPLE II

Various modifications in the compositions of pastes comprising colloidal silica and at least one glass component metal oxide are possible. Instead of using the 50 g. of alumina and 30 g. of calcium hydroxide of Example I, some of the appropriate formulations in preparing such pastes are shown in the following table:

Table I

|  | A | B | C | D |
|---|---|---|---|---|
| Al₂O₃ | 50 | 40 | 20 | 1 |
| ZrO₂ |  |  | 10 | 1 |
| ZrSiO₄ |  | 20 |  | 1 |
| TiO₂ |  |  | 5 | 1 |
| ZnO |  | 20 | 15 | 1 |
| Ca(OH)₂ |  |  |  | 1 |
| BaO |  |  |  | 1 |
| As₂O₃ |  |  | 3 | 1 |
| GeO₂ |  |  | 2.5 | 1 |
| P₂O₅ |  |  |  | 1 |
| PbO₂ |  |  |  | 1 |
| ThO₂ |  |  |  | 1 |
| BeO |  |  |  | 1 |
| WO₃ |  |  |  | 1 |

Other formulations would include up to about 60 g. of any of said glass components per 30 g. of colloidal silica, or a total of up to about 90 g. of said glass components per 30 g. of colloidal silica. The final drawing composition may contain glass components introduced in the water or otherwise, but because the final drawing composition should contain solids at least 0.1% of which are other than compounds of silicon, sodium and potassium, most of the formulations for the paste prepared from colloidal silica contain, in addition to boric acid, an amount of other metal oxides constituting at least 3% of the silica content of the colloidal silica paste.

EXAMPLE III

The colloidal silica paste can be prepared, not merely with variations in the concentration in the miscellaneous oxides, but also with variations in the concentration of boric acid. In discussing the analysis of a glass structure, it is convenient to refer to the boria content, to the alumina content, and the like. In preparing aqueous systems, it is convenient to employ the hydrated modifications of such oxides, using for example, 124 g. of boric acid in a formulation designating 70 g. of boria.

In preparing aqueous systems comprising colloidal silica and boria, the ratio of boria to silica is preferably within the range of from 0.2 to 1 to about 1.2 to 1, although smaller or larger ratios can be operable in appropriate formulations. Thus to a solution of 100 g. of 30% colloidal silica, the amount of boria is preferably between 6 g. and 36 g., so that the amount of boric acid stirred into the colloidal silica solution should desirably be from 10 to 63.5 g., but may be smaller or greater for appropriate formulations.

A paste can be prepared by stirring 10 g. of boria into 200 ml. of 15% colloidal silica, and thereafter stirring 50 g. of alumina and 30 g. of calcium hydroxide into the boria-silica system. Pastes of this nature are useful in the preparation of glass drawing compositions.

EXAMPLE IV

A commercially available sodium silicate solution had a density designated as 38° Bé. (1.36 g./ml.) and contained 3.22 parts of silica per part of sodium oxide, or about 8.5% sodium oxide, about 27.5% silica, and about 64% water. Heat was applied during about 3 hours to evaporate about 37.5 g. of water from 187.5 g. of such a solution. About 31.3% of the water content or about 20% of the solution was lost by evaporation. In concentrating the solution, colloidal silicate particles were formed and dispersed within the concentrated sodium silicate solution.

A paste containing colloidal silica, boria, and additional metal oxides, prepared as set forth in any of Examples I, II, or III is mixed with the concentrated sodium silicate. For specificity, reference is made to the procedure using the paste of Example I. The 380 g. of mixture of boria, alumina, calcium hydroxide, colloidal silica and water was stirred with the 150 g. of concentrated sodium silicate solution to form 530 g. of paste, which was thoroughly mixed into 1000 g. of the previously described commercially available sodium silicate solution. The 1530 g. of mixture was heated to evaporate 382.5 g. of water, leaving a viscous liquid designated as a drawing composition. Data relating to this composition are set forth in Table I.

Table I

|  | H₂O | Na₂O | SiO₂ | B₂O₃ | CaO | Al₂O₃ | Total |
|---|---|---|---|---|---|---|---|
| Colloidal Silica | 170.0 |  | 30.0 |  |  |  | 200 |
| Additives |  |  |  | 100 | 30 | 50 | 180 |
| Concentrated Silicate | 82.5 | 16 | 51.5 |  |  |  | 150 |
| Regular Silicate | 640.0 | 85 | 275.0 |  |  |  | 1,000 |
| Before Concentration | 892.5 | 101 | 356.5 | 100 | 30 | 50 | 1,530 |
| Viscous Liquid | 510 | 101 | 356.5 | 100 | 30 | 50 | 1,147.5 |
| Percent Wet | 44.4 | 8.8 | 31.1 | 8.7 | 2.6 | 4.4 |  |
| Percent Dry |  | 15.8 | 56.0 | 15.7 | 4.7 | 7.8 |  |

The most important characteristic of the viscous composition is its drawability. Thus, filaments can be drawn from the upper surface of the viscous composition analogously to the manner in which glass filaments can be drawn from molten glass.

Into said viscous composition consisting essentially of 44.4% water, 8.8% sodium oxide, 31.1% silica, 8.7% boria, 2.6% lime, and 4.4% alumina, a glass rod is immersed enough to withdraw a small amount. By pulling the glob of viscous composition at a rate of several yards per second, a very fine glass fiber was formed. Continuous glass fibers were hand drawn from the tip of a glass funnel containing said viscous composition.

Various individual fibers were measured under the microscope to establish their diameters as within the range from about 2 to about 14 microns. Tensile strength measurements established that some of the fibers had a tensile strength of 250,000 pounds per square inch, approximately equal to the tensile strength of textile glass fibers. Moreover, fibers having a tensile strength of at least 100,000 p.s.i. were repeatedly prepared by the hand drawing method. Density measurements established that the glass fibers had a minimum specific gravity of about 2.2 for large diameter fibers and an average of 2.4 and up to 2.47 for small diameter fibers, thus indicating that the fibers were substantially dehydrated.

Because the finished glass fibers have such a high density and possess such high tensile strengths, the fibers cannot have the microporous structure of a dehydrated silica gel. Accordingly, the dehydration phenomenon differs from the dehydration of silica gel. The viscous stream of drawable composition is transformed into a glass fiber by simultaneous syneresis, elongation, and diameter reduction. A large surface area for the evaporation of water is available. The evaporation is neither too rapid nor too slow by reason of the fact that the water partial pressure is greater than 10 mm. but less than saturation for the temperature of the atmosphere of the evaporation zone.

The forces elongating the fiber and simultaneously contracting the fiber diameter might help to preserve the flowability of the composition during its concentration to a lower and lower water content. In the closepacked condition resulting from a water content of a less than 10%, solidification would readily occur, and would tend to bring about the kind of dehydration reactions analogous to the polymerization of silicic acid.

By controlling the composition so that it initially contains less than about 62.5% water, and by stretching the stream of viscous composition at least tenfold to a diameter less than 20 microns, and by complying with the other requirements of the present invention, glass fibers are formed by syneresis.

It is interesting to speculate that, during the formation of the fiber from viscous compositions, and during the presence of more than about 10% water, the sodium ions might possess a much greater mobility than the ions of the metals such as aluminum, and calcium. During the contracting of the stream there might be a tendency for the sodium ions to migrate toward the axis of the stream and away from the cylindrical surfaces of the stream. Some water might migrate from the axis toward the cylindrical surface. Thus there might be a somewhat countercurrent movement of the sodium ions and water during the contracting of the stream until its water content was reduced below 10%.

EXAMPLE V

A composition is prepared in accordance with Example IV except that in the final concentration step, only 225 g. of water are evaporated, providing 1305 g. of viscous drawing composition containing 51.2% water, 7.7% sodium oxide, 27.3% silica, 7.7% boria, 2.2% lime and 3.9% alumina. The higher water content and lower viscosity of the drawing composition makes it even more suitable for glass fiber drawing by hand than the drawing composition of Example IV. The considerable stretching of the fiber during the rapid contraction of the diameter to less than 20 microns and to less than one-third the diameter of the initial stream (that is, elongating a theoretical cylinder of viscous stream to a theoretical cylinder at least ten times having an axial length the initial cylinder or tenfold elongation) brings about synerisis and the formation of a dehydrated glass fiber.

EXAMPLE VI

A series of drawing compositions are prepared following the general procedures of Examples IV and V, but using the pastes of Examples II and III, instead of the paste of Example I. Strong, dehydrated glass fibers are prepared by forming a viscous stream of such drawing composition, elongating or stretching such stream rapidly to contract its diameter to less than one-third, thereby bringing about syneresis and the formation of a core of high density glass and the concentration of the water at the cylindrical surfaces of said stream.

EXAMPLE VII

A solution having density 1.2 and containing 30% colloidal silica was employed and an amount of boric acid which was slightly more than the amount of the silica. To 120 cc. of the 30% silica solution (corresponding to 43.2 g. of silica), 47 g. of boric acid were added gradually with stirring, thus forming an aqueous system containing both silica and boria. Possibly the boria was in part adsorbed on the surface of the colloidal silica particles. Possibly the system included both dissolved and adsorbed boria.

To the silica boria mixture, 16 g. of alumina were added gradually with stirring, and then 10 g. of zinc oxide were introduced. In this manner 216.3 g. of a paste of uniform consistency was prepared containing 43 g. of colloidal silica, 26.5 g. of boria, 16 g. of alumina, 10 g. of zinc oxide (95.5 g. of solids) and 121.8 g. of water.

In a separate container, there was measured a sodium trisilicate solution which contained 3.3 parts of silica per part of sodium oxide, or about 8.5% sodium oxide, about 27.5% silica, and about 64% water, and a density designated as 38° Bé. (1.36 g./ml.). Some commercially available sodium trisilicate solutions corresponded exactly to such specifications, but some samples contained 65% water (35% solids) instead of 64% water, and some samples contained significant amounts of contaminants such as calcium oxide and aluminum oxide. Difficulties with such impurities can be avoided by employing a freshly prepared sample of sodium trisilicate resulting from the dispersion of fresh gelatinous silica in aqueous sodium hydroxide or by dispersing purified granular sodium trisilicate in deionized water.

The sodium trisilicate solution was heated during about 3 hours to evaporate water from the solution, and to increase the solids content from about 35% to above 40%. Thus, 600 g. of such concentrated silicate was prepared. In concentrating the solution, colloidal silicate was formed and dispersed within the concentrated sodium silicate solution.

It is convenient to designate the colloidal siliceous particles dispersed in sodium silicate as colloidal silicate particles by reason of the practice of some writers of recognizing the existence of colloidal silica only in acidic or neutral solutions (as distinguished from the alkaline pH of a sodium silicate solution). The 216.8 g. of mixture of boria, alumina, zinc oxide, colloidal silica and water was stirred into 600 g. of concentrated sodium silicate to form 817 g. of paste, which was thoroughly mixed into 1200 g. of a liquid consisting of 800 g. of a 33% solution of a sodium trisilicate and 400 g. of a 25.1° Bé. solution of pure sodium metasilicate. The 2016.8 grams of mixture were heated to evaporate sufficient water to concentrate the solution to a solids content of 40% to prepare a viscous liquid designated as a drawing composition. Data relating to this composition are set forth in Table I.

Table I

|  | H₂O | Na₂O | SiO₂ | B₂O₃ | ZnO | Al₂O₃ |
| --- | --- | --- | --- | --- | --- | --- |
| Colloidal Silica | 100.8 |  | 43.2 |  |  |  |
| Additives | 20.5 |  |  | 26.5 | 10 | 16 |
| Concentrated silicate | 360 | 55.8 | 184.2 |  |  |  |
| Trisilicate | 508 | 68 | 204 |  |  |  |
| Metasilicate | 324.7 | 38.1 | 37.2 |  |  |  |
| Before concentration | 1,314 | 161.9 | 488.6 | 26.5 | 10 | 16 |
| After concentration | 1,064 | 161.9 | 488.6 | 26.5 | 10 | 16 |
| Percent wet | 60.23 | 9.16 | 27.65 | 1.5 | 0.56 | 0.9 |
| Percent dry |  | 23.02 | 69.48 | 3.78 | 1.42 | 1.26 |

The viscous liquid prepared in the manner set forth has at room temperature many properties similar to those of molten glass at elevated temperature. Instead of being a granular gelatinous mass, or a firm gel, the composition flows as a high viscosity liquid. In flowing through a borosilicate glass funnel, its behavior resembles rubber cement and differs from the behavior of gelatinous silica or 38° Bé. sodium silicate solution. The most important characteristic of the viscous composition is its drawability. Thus filaments can be drawn from the upper surface of the viscous composition analogously to the manner in which glass filaments can be drawn from molten glass.

Into said viscous composition, consisting essentially of 60.23% water, 9.16% sodium oxide, 27.65% silicate, 1.5% boria, 0.56% zinc oxide, and 0.9% alumina, a glass rod is immersed enough to withdraw a small amount. By pulling the glob of viscous composition at a rate of several yards per second, a very fine glass fiber was formed. Continuous glass fibers were hand drawn from the tip of a glass funnel containing said viscous composition. Various individual fibers were measured under the microscope to establish their diameters as within the range from about 2 to about 14 microns. Tensile strength measurements established that some of the fibers had a tensile strength of 375,000 pounds per square inch, approximately equal to the tensile strength of textile glass fibers. Moreover, fibers having a tensile strength of at least 75,000 p.s.i. were repeatedly prepared by the hand drawing method. Density measurements established that the glass fibers had a minimum specific gravity of about 2.2 for large diameter fibers and an average of 2.4 and up to 2.47 for small diameter fibers, thus indicating that the fibers were substantially dehydrated.

Because the finished glass fibers have such a high density and possess such high tensile strength, the fibers cannot have the microporous structure of a dehydrated silica gel. Accordingly, the dehydration phenomenon differs from the dehydration of silica gel. The shrinking capacity of the composition persists until the composition contains less than 10% water, and the solidification of the fiber is postponed until the water content of the internal structure of the fiber is reduced by the simultaneous elongation, syneresis and diameter reduction to less than 10%.

The viscous stream of drawable composition is transformed into a glass fiber by simultaneous syneresis, elongation, and diameter reduction. A large surface area for the evaporation of water is available. The evaporation is neither too rapid nor too slow by reason of the fact that the water partial pressure is greater than 10 mm. but less than saturation for the temperature of the atmosphere of the evaporation zone. The forces employed for elongating the fiber and simultaneously contracting the fiber diameter might help to preserve the flowability of the composition during its concentration to a lower water content as water is rapidly forced out of the internal structure and onto the surface of the stream by syneresis. In the evaporation zone, water is rapidly evaporated from the increasing surface area of the small diameter stream. In the close-packed condition resulting from a water content of less than 10%, solidification would readily occur, and would tend to bring about the kind of dehydration reaction analogous to the polymerization of silicic acid.

By controlling the composition so that it initially contains less than about 62.5% water, so that the silica content is at least 40% of the solids content of the composition, so that the composition contains colloidal silicate particles, so that the composition contains at least one oxide from the class consisting of sodium oxide and potassium oxide, so that the composition contains at least one of the other glass-forming oxides, by forming the composition into a stream, by stretching the stream to reduce its diameter to less than one-third its initial diameter (that is, by elongating a theoretical cylinder of the viscous stream at least tenfold, the diametrical ratios of the extent of stretching being the square root of the longitudinal ratios) by stretching the stream of viscous composition to a diameter less than 20 microns, and by complying with the other requirements of the present invention, glass fibers are formed by syneresis.

It is interesting to speculate that, during the formation of the fiber from viscous compositions, and during the presence of more than about 10% water, the sodium ions might possess a much greater mobility than the ions of the metals such as aluminum, and calcium. As soon as the evaporation of water from the contracting stream begins, there might be a tendency for the sodium ions to migrate toward the axis of the stream and away from the cylindrical surfaces of the stream. As the water is evaporated from the surface of the stream, some water might migrate from the axis toward the cylindrical surface. Thus there might be a somewhat countercurrent movement of the sodium ions and water during the contracting of the stream until its water content is reduced below 10%.

EXAMPLE VIII

A series of compositions were prepared, following the general procedure of Example VII, and shown to be suitable for the preparation of glass fibers having a diameter range from 0.4 to 20 microns, and a tensile strength of at least 30,000 pounds per square inch. The method of preparing stable glass fibers from such aqueous compositions included the steps of: forming a viscous stream of said aqueous system; contracting the diameter to less than one-third of the initial diameter of the viscous stream by elongating the viscous stream in a gaseous atmosphere containing at least 10 mm. water vapor pressure, there being simultaneous elongating and syneresis so that the diameter-contracting continues until the density of the fiber is of the magnitude of the density of a fused fiber of the same composition; evaporating water from the surface of the stream; and withdrawing as the product of the method a very strong inorganic fiber which can be proven to be an amorphous, non-crystalline, high density glass.

Data relating to some of the aqueous systems suitable for the preparation of glass fibers by such method are shown in Table I.

Table I

|  | A | B | C | D | E |
|---|---|---|---|---|---|
| g. 30% col. $SiO_2$ | 120 | 120 | 120 | 252 | 507 |
| g. $H_3BO_3$ | 22 | 14.4 | 11 | 12 | 28.6 |
| g. $Al_2O_3$ | 58 | 63 | 70 | 78 | 100 |
| g. ZnO | 7 | 7 | 7 | 8 | 14.4 |
| g. conc. 40% trisilicate | 250 | 250 | 250 | 150 | 0 |
| g. 35% silicate | 300 | 300 | 300 | 200 | 0 |
| g. 17.4% $NaSiO_3$ | 200 | 200 | 300 | 450 | 848 |

Glass fibers having tensile strengths as low as 30,000 p.s.i. are useful for insulation, and possess advantages over rock wool insulation.

EXAMPLE IX

By a series of tests, evidence is obtained suggesting the advantages of preparing glass fibers from aqueous systems made up within appropriate ranges. The viscous stream should desirably have a water content less than 62.5%. The pH of the stream must be on the alkaline side, that is, greater than 7.0 pH. The solids content must be at least 40% silicate, and some of the silicate must be colloidal silicate particles. Sodium silicate or potassium silicate or mixtures thereof may be used. The finished fiber must contain at least 0.1% metal oxide of the non-alkaline glass component group. In order to prepare compositions having a good glass drawing characteristic, the aqueous alkaline silicate solution finally subjected to concentration desirably contains the combination of a glass component anion, such as borate, and a glass component cation such as zinc oxide. The presence of the anion glass component is particularly advantageous. Some of the possibilities are suggested in Table I.

Table I

|  | E | F | G | HH | J | K | Min., Percent | Max., Percent |
|---|---|---|---|---|---|---|---|---|
| Colloidal $SiO_2$ | 0 | 200 | 300 | 200 | 300 | 200 | 0 | 50 |
| Boric acid | 0 | 30 | 0 | 179 | 10 | 30 | 0 | 12 |
| Alumina trihyd | 0 | 2 | 30 | 73 | 0 | 73 | 0 | 18 |
| Zirconia | 0 | 2 | 0 | 0 | 0 | 0 | 0 | 18 |
| Titania | 0 | 2 | 10 | 0 | 0 | 0 | 0 | 18 |
| Zinc oxide | 0 | 2 | 10 | 0 | 0 | 0 | 0 | 18 |
| Calcium hydroxide | 0 | 2 | 10 | 30 | 25 | 30 | 0 | 18 |
| Miscel. gl. com | 1 | 18 | 0 | 0 | 30 | 0 | 0 | 18 |
| Total gl. com | 1 | 60 | 60 | 282 | 65 | 133 | 0.1 | 18 |
| Initial silicate | 220 | 400 | 580 | 187.5 | 580 | 187.5 | 10 | 90 |
| $Na_2O$ | 15 | 16 | 43.9 | 16 | 93.9 | 16 | 0 | 30 |
| $K_2O$ | 5 | 0 | 0 | 0 | 0 | 0 | 0 | 30 |
| $SiO_2/A_2O$ ratio | 2.3 | 5.1 | 3.4 | 3.2 | 3.4 | 3.2 | 2.0 | 5.3 |
| Percent water | 70 | 75 | 67 | 64 | 67 | 64 | 40 | 95 |
| Percent $H_2O$ in conc | 57 | 40 | 50 | 44 | 50 | 44 | 35 | 65 |
| Addn. silicate | 800 | 800 | 1,200 | 1,000 | 1,200 | 1,000 | 10 | 90 |
| Percent $H_2O$ loss | 20 | 33 | 10.5 | 42.9 | 10.5 | 42.9 | 10 | 80 |
| Percent $H_2O$ in drew. c | 56 | 50 | 60 | 44.4 | 60 | 44.4 | 37.5 | 62.5 |
| glass fiber analysis: |  |  |  |  |  |  |  |  |
| Percent $A_2O$ | 29.5 | 11.4 | 19.0 | 15.8 | 17.7 | 18.0 | 6.0 | 40 |
| Percent $SiO_2$ | 60 | 74.4 | 73.8 | 56.0 | 72.3 | 65.8 | 40.0 | 85 |
| Percent $B_2O_3$ | 0 | 7.1 | 0 | 15.7 | 1.4 | 2.0 | 0 | 20 |

EXAMPLE X

Following the procedure of Example VII, an aqueous system was prepared using 120 g. of 30% colloidal silica solution, 11 g. boric acid, 76 g. alumina, 7 g. zinc oxide, 250 g. concentrated silicate, 300 g. sodium trisilicate, and 200 g. sodium metasilicate solution. Strong glass fibers were hand drawn from the concentrated solution. The viscous liquid was filtered, and the filtrate was employed in a stretch fiber-forming apparatus to prepare glass fibers. Certain components were preferentially removed from the composition by the filtration, as indicated by the analysis of the hand drawn and machine-drawn fibers, as shown:

*Table I*

|  | hand drawn | machine drawn |
| --- | --- | --- |
| $Na_2O$ | 18.0 | 23.8 |
| $SiO_2$ | 57.6 | 65.5 |
| $B_2O_3$ | 1.7 | 5.0 |
| $Al_2O_3$ | 20.8 | 3.8 |
| $ZnO$ | 1.9 | 1.8 |

It is impossible to obtain reliable information concerning the pre-filtration of the viscous liquid by analyzing the machine-drawn glass fiber because sometimes there may be preferential deposition of components during the filtering which precedes passage of the liquid through a fine orifice of a glass fiber making machine. Whether the glass fibers are hand-drawn or machine-drawn, there is much in common both as to the analyses of the drawing compositions and the method of preparing the glass fibers therefrom.

EXAMPLE XI

Freshly prepared glass fibers resulting from one of the previous examples were dipped for about one second in an aqueous solution containing about 10% acetic acid, and then passed through a drying zone maintained at about 325° F. The volatile acid served as a dehydration catalyst, and helped bring about some further modification of the surface of the glass fiber in the hot drying zone. Such surface dehydration is very different from any dehydration of the internal structure of a siliceous composition.

Instead of using acetic acid, other volatile acids completely vaporized from glass fibers at temperatures of the order of 350° to 400° F., such as nitric acid, oxalic acid, citric acid, and formic acid, can be employed. Although only minor amounts of the catalyst are employed, it is generally not desirable to contaminate the surface of the glass fiber by using acids leaving a residue at 400° F., such as hydrochloric acid, hydrobromic acid, and sulfuric acid. Because the acid is intended merely to catalyze the hot dehydration, it may be of any of a wide range of concentrations, generally within the 5% to 25% range, and preferably about 10%. Concentrated acids such as 100% or 98% sulfuric acid should not be used. Because the goal is to minimize leaching and to apply the acid catalyst to the freshly formed fiber, the contact between the acid and fiber should be brief, preferably only for about 1 second. The fiber can be passed through a spray of dilute acid or can be coated in other manners. Any temperature which is significantly below the fusion temperature of the fiber can be employed in the final stage of drying the fiber, thereby assuring adequate volatization of any residual catalyst.

Instead of using a dilute acid as the dehydration catalyst, an organic solvent which is miscible with water can be employed. For example, freshly formed glass fibers can be immersed for about 1 second in a 50% dioxane solution, and the coated fibers dried at 350° F.

The dehydration catalyst may also be an aqueous solution of a zirconium salt. Glass fibers prepared in accordance with any of Examples IV-XX are dipped in a 10% solution of zirconium acetate for about 1 second, and the catalyst coated fibers are dried at 350° F.

EXAMPLE XII

Glass-drawing compositions were prepared following the general procedures of suitable previous examples, but modifying the compositions in an effort to learn the limits. Satisfactory fibers are prepared only if the viscous composition contains not merely sodium and/or potassium silicate but also a measurable amount of an oxygen-containing compound of at least one metal, the oxides of which belong in the non-alkaline glass component group, such as boria, alumina, zirconia, titania, zinc oxide, calcium oxide, barium oxide, germania, hafnia, phosphoric oxide, lead oxide, thoria, beryllia, and tungstic oxide. Advantages are obtained by concentrating the final glass drawing composition to reduce the water content to below 62.5%, while retaining at least 37.5% water in such composition. The glass drawing compositions have a viscosity in excess of 14 poises, and are viscous liquids, capable of flowing as a stream of contracting diameter through the elongation zone. Glass fibers are formed from the glass-drawing composition by forming a stream of the viscous liquid, applying forces to elongate the stream at least tenfold, thereby reducing the diameter of the liquid stream to not more than one-third its original diameter. In the evaporation zone, the water partial pressure is at least 10 mm. Glass fibers are formed by syneresis and by substantially complete dehydration of the drawing composition. The effectiveness of the dehydration is shown by the high density and high tensile strength of the completed fibers.

EXAMPLE XIII

A series of measurements and tests are made on a group of fibers. The fiber diameter was measured by observing the fiber under a microscope together with a set of glass fibers of known diameter. The cross sectional areas were calculated from the fiber diameter. The tensile strength of a fiber was determined by measuring the free load supported by the fiber and calculating the relationship between the load and cross-sectional area of the fiber. An upper portion of a sample of a fiber is held firmly, and a pan of known weight is suspended from a lower portion of the fiber. Additional analytical weights are placed in the pan until the fiber breaks. The tensile strength is calculated from the maximum weight thus carried by the fiber as related to the cross-sectional area of the fiber. A fiber having a diameter of 4 microns, and thus a cross-sectional area of $1.26 \times 10^{-7}$ cm.$^2$ and supporting 12.6 g. has a tensile strength of $10^5$ kg./cm.$^2$ or 1,422,000 p.s.i. Similarly, a 10 micron fiber supporting a 5.60 g. weight but breaking with 5.61 g. would have a tensile strength of 100,000 p.s.i.

Commercially available glass fibers, prepared from fused glass, generally decrease in tensile strength after immersion in water for 24 hours. The sensitivity of a fiber to water is measured by the wet strength test after 24 hours' immersion. An acid resistant fiber undergoes no change detectable by microscopic inspection after the fiber has been immersed in 98% sulfuric acid for 8 hours and thoroughly rinsed in water. A heat resistant fiber undergoes no significant change upon being subjected for a few seconds to the reduced zone of a very gentle gas flame. The fibers of the examples withstand the flame test about as well as commercially available fused glass fibers. Glass fibers can be prepared in accordance with the examples to withstand the steam test, consisting of positioning the fiber over a beaker of boiling water for 15 minutes. The results of some of the tests are shown:

Table I

| Example | Diameter in microns | Type | Dry Strength, p.s.i. | Wet Strength, p.s.i. |
|---------|---------------------|------|----------------------|----------------------|
|         | 7 | Commercial fused glass. | 250,000 | 125,000 |
| VI      | 7 |  | 250,000 | 120,000 |
| XI      | 7 | acid-catalyst | 260,000 | 180,000 |
| XI      | 7 | dioxane-catalyst | 200,000 | 200,000 |
| VI      | 10 | II-C paste (zirconia glass). | 160,000 | 130,000 |

Obviously various modifications of the compositions and procedures are possible without departing from the scope of the invention as defined in the appended claims.

The invention claimed is:

1. The method which includes the steps of: preparing a viscous aqueous system essentially of water, oxygen-containing compounds of silicon comprising silicate particles of colloidal dimensions, oxygen-containing compounds of at least one alkali metal of the group consisting of sodium and potassium, and oxygen-containing compounds of at least one element of the group consisting of boron, aluminum, zirconium, titanium, zinc, calcium, barium, arsenic, germanium, phosphorus, lead, thorium, beryllium, and tungsten, the oxides of said elements constituting the non-alkaline glass component oxide group, said glass component oxides being present in a concentration several times greater than the solubility limits for such oxides in aqueous alkaline silicates, and being components of the colloidal silicate particles; forming a viscous stream of said aqueous stream; contracting the diameter of the stream to less than one-third of the initial diameter of the viscous stream and to less than 20 micron diameter by elongating the viscous stream in a gaseous atmosphere containing at least 10 mm. water vapor pressure, there being simultaneous elongating and syneresis, whereby water is concentrated at the surface of the stream and oxygen-containing compounds of silicon and oxygen-containing compounds of an alkali metal are concentrated at the core of the stream; evaporating water from the surface of the stream; and withdrawing as the product of the method a stable, amorphous glass fiber containing more than 40% silica, an oxide of at least one alkali metal of the group consisting of sodium and potassium, and at least one member of the non-alkaline glass component group consisting of the oxides of boron, aluminum, zirconium, titanium, zinc, calcium, barium, arsenic, germanium, phosphorus, lead, thorium, beryllium, and tungsten, said glass fiber having a tensile strength of at least 30,000 pounds per square inch.

2. The method which includes the steps of: preparing a viscous aqueous system having a viscosity of at least 14 poises and consisting essentially of water, oxygen-containing compounds of silicon comprising silicate particles of colloidal dimensions, oxygen-containing compounds of at least one alkali metal of the group consisting of sodium and potassium, and oxygen-containing compounds of at least one element of the group consisting of boron, aluminum, zirconium, titanium, zinc, calcium, barium, arsenic, germanium, phosphorus, lead thorium, beryllium, and tungsten, the oxides of said elements constituting the non-alkaline glass component oxide group, said glass component oxides being present in a concentration several times greater than the solubility limits for such oxides in aqueous alkaline silicates, and being components of the colloidal silicate particles; forming a viscous stream of said aqueous stream, said stream having a diameter less than 200 microns; contracting the diameter of the stream to less than one-third of the initial diameter of the viscous stream and to less than 20 micron diameter by elongating the viscous stream in a gaseous atmosphere containing at least 10 mm. water vapor pressure, there being simultaneous elongating and syneresis, whereby water is concentrated at the surface of the stream and oxygen-containing compounds of silicon and oxygen-containing compounds of metals are concentrated at the core of the stream; evaporating water from the surface of the stream; and withdrawing as the product of the method a stable, amorphous glass fiber containing less than 10% water, more than 40% silica, an oxide of at least one alkali metal of the group consisting of sodium and potassium, and at least one member of the non-alkaline glass component group consisting of the oxides of boron, aluminum, zirconium, titanium, zinc, calcium, barium, arsenic, germanium, phosphorus, lead, thorium, beryllium, and tungsten, said glass fiber having a tensile strength of at least 30,000 pounds per square inch initially and also after aging for three months.

3. The method of claim 1 in which the fiber is subjected to a drying zone maintained above 200° F. and significantly below the fusion point of the glass fiber.

4. The method of preparing a glass fiber comprising the steps of: preparing an aqueous solution of colloidal silica; dispersing glass-forming oxides other than alkali metal oxides with said colloidal silica to form a siliceous composition; dispersing said siliceous composition in an aqueous alkaline silicate solution containing more alkaline silicate than the amount of said siliceous composition; preparing a viscous aqueous composition containing alkaline silicate particles of colloidal dimensions by heating said mixture of siliceous composition and alkaline silicate solution to evaporate water therefrom; drawing a viscous stream from said concentrated, viscous aqueous composition; subjecting said stream to elongation; evaporating water from the stream in a gaseous atmosphere having at least 10 mm. water vapor pressure; continuing the elongation of the stream until the diameter of the siliceous stream, exclusive of any peripheral water film, is less than 20 microns, and until the water content of the siliceous stream is less than 10% by weight; and withdrawing a glass fiber as the product of said process.

References Cited in the file of this patent

UNITED STATES PATENTS 2,338,463     Skaupy _____ Jan. 4, 1944

FOREIGN PATENTS 352,681     Great Britain _____ July 16, 1931